(12) United States Patent
Sasaki

(10) Patent No.: US 8,917,936 B2
(45) Date of Patent: Dec. 23, 2014

(54) IMAGE PICKUP APPARATUS AND METHOD FOR CONTROLLING THE SAME FOR ASSOCIATING CAPTURED IMAGE WITH STORED PRECEDING RECOGNITION RESULT

(75) Inventor: Futoshi Sasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1054 days.

(21) Appl. No.: 12/265,606

(22) Filed: Nov. 5, 2008

(65) Prior Publication Data

US 2009/0123072 A1    May 14, 2009

(30) Foreign Application Priority Data

Nov. 14, 2007 (JP) ................. 2007-295989

(51) Int. Cl.
  *G06K 9/00* (2006.01)
  *G06K 9/32* (2006.01)
  *G06K 9/20* (2006.01)
(52) U.S. Cl.
  CPC ............ *G06K 9/20* (2013.01); *G06K 9/3258* (2013.01); *G06K 9/3233* (2013.01)
  USPC ............ 382/181; 382/115; 382/321; 382/305
(58) Field of Classification Search
  USPC ........................................ 382/181, 321, 305
  See application file for complete search history.

(56) References Cited

U.S. PATENT DOCUMENTS

| | | | | |
|---|---|---|---|---|
| 5,289,275 A * | 2/1994 | Ishii et al. | ...................... | 348/154 |
| 6,351,574 B1 * | 2/2002 | Yair et al. | ...................... | 382/321 |
| 6,563,948 B2 * | 5/2003 | Tan et al. | ...................... | 382/187 |
| 6,721,451 B1 * | 4/2004 | Ishitani | ............. | 382/181 |
| 6,947,596 B2 * | 9/2005 | Kashioka et al. | ............. | 382/186 |
| 7,137,076 B2 * | 11/2006 | Iwema et al. | ................. | 715/863 |
| 7,162,086 B2 * | 1/2007 | Ikeda | ............. | 382/182 |
| 7,266,224 B2 * | 9/2007 | Sukegawa | ................. | 382/118 |
| 7,289,685 B1 * | 10/2007 | Wolff et al. | ................. | 382/317 |
| 7,949,191 B1 * | 5/2011 | Ramkumar et al. | ........... | 382/209 |
| 8,036,417 B2 * | 10/2011 | Gallagher et al. | ............ | 382/100 |
| 8,553,083 B2 * | 10/2013 | Kim et al. | ................. | 348/135 |
| 2003/0156755 A1 | 8/2003 | Watanabe | | |
| 2005/0286765 A1 * | 12/2005 | Nakayama | ................. | 382/182 |
| 2006/0013484 A1 * | 1/2006 | Kono | ............. | 382/181 |
| 2006/0080543 A1 * | 4/2006 | Yen et al. | ................. | 713/183 |

(Continued)

FOREIGN PATENT DOCUMENTS

| | | | |
|---|---|---|---|
| JP | 2003-037770 A | 2/2003 |
| JP | 2003-037770 A | 2/2003 |

(Continued)

*Primary Examiner* — Jayesh A Patel
(74) *Attorney, Agent, or Firm* — Canon U.S.A., Inc. IP Division

(57) ABSTRACT

An image pickup element capture an image of an object, and detailed unique information relating to the captured image is automatically associated with the image through pattern recognition so that the image is easily managed. A pattern detector performs the pattern recognition on an image obtained through a pre-photographing operation, and a result of the recognition is stored in a memory. A code comparator compares stored a preceding recognition result with the latest recognition result obtained through the pattern recognition performed using the pattern detector. In accordance with a result of the comparison, the stored recognition result is updated. When it is determined that a predetermined pattern is not included in the image obtained using the image pickup element, the recognition result stored in the memory is associated with the captured image.

10 Claims, 14 Drawing Sheets

(56) References Cited

U.S. PATENT DOCUMENTS

| | | | |
|---|---|---|---|
| 2006/0123236 A1* | 6/2006 | Itoh et al. | 713/176 |
| 2006/0139492 A1* | 6/2006 | Ahn et al. | 348/558 |
| 2006/0204098 A1* | 9/2006 | Gaast | 382/182 |
| 2007/0031010 A1* | 2/2007 | Sukegawa et al. | 382/118 |

FOREIGN PATENT DOCUMENTS

| | | |
|---|---|---|
| JP | 2003-198909 A | 7/2003 |
| JP | 2003-242440 A | 8/2003 |
| JP | 2009-124439 A | 6/2009 |

* cited by examiner

CHARACTER INFORMATION: 2007 SCHOOL YEAR ENTRANCE CEREMONY
FOCAL LENGTH: 35 mm
LENS DISTANCE INFORMATION: 5 m
THE NUMBER OF PEOPLE: 3

CHARACTER INFORMATION: 2007 HOOL YEAR
  NTRANCE
FOCAL LENGTH: 70 mm
LENS DISTANCE INFORMATION: 5 m
THE NUMBER OF PEOPLE: 3

CHARACTER INFORMATION: NON
FOCAL LENGTH: 50 mm
LENS DISTANCE INFORMATION: 5 m
THE NUMBER OF PEOPLE: 3

CHARACTER INFORMATION: NON
FOCAL LENGTH: 35 mm
LENS DISTANCE INFORMATION: 5 m
THE NUMBER OF PEOPLE: 3

CHARACTER INFORMATION: NON
FOCAL LENGTH: 24 mm
LENS DISTANCE INFORMATION: 5 m
THE NUMBER OF PEOPLE: 2

CHARACTER INFORMATION: XXX ELEMENTARY SCHOOL ENTRANCE CEREMONY
FOCAL LENGTH: 35 mm
LENS DISTANCE INFORMATION: 5 m
THE NUMBER OF PEOPLE: 1

CHARACTER INFORMATION: NON
FOCAL LENGTH: 32 mm
LENS DISTANCE INFORMATION: 4.5 m
THE NUMBER OF PEOPLE: 3

CHARACTER INFORMATION: 2007 SCHOOL YEAR
                      ENTRANCE CEREMONY
FOCAL LENGTH: 50 mm
LENS DISTANCE INFORMATION: 5 m
THE NUMBER OF PEOPLE: 3

FIG. 14A
FACE

| NAME | Bitmap |
|---|---|
| Mike | (face) |
| Ken | (face) |
| . | |
| Jane | (face) |

FIG. 14B
PHRASE

| NOUN | Code |
|---|---|
| ELEMENTARY SCHOOL | 8F AC 8A 77 8D 5A |
| JUNIOR HIGH SCHOOL | 92 86 8A 77 8D 5A |
| HIGH SCHOOL | 8D 82 8D 5A |
| . | |
| UNIVERSITY | 91 E5 8A 77 |

FIG. 14C
SIGN

| SIGN | Bitmap |
|---|---|
| PROHIBITION SIGN | (sign) |
| STOP SIGN | (sign) |
| . | |
| INFORMATION CENTER | (sign) |

FIG. 14D
COMPANY LOGO

| COMPANY NAME | Bitmap |
|---|---|
| XXX DELIVERY COMPANY LIMITED | XXX DELIVERY COMPANY |
| . | |

IMAGE PICKUP APPARATUS AND METHOD FOR CONTROLLING THE SAME FOR ASSOCIATING CAPTURED IMAGE WITH STORED PRECEDING RECOGNITION RESULT

BACKGROUND OF THE INVENTION

1. Field of the Invention

The present invention relates to image pickup apparatuses such as digital still cameras, and particularly relates to a technique of storing and managing data representing an image captured using an image pickup apparatus.

2. Description of the Related Art

As a format of images captured using digital still cameras, a DCF (Design Rule for Camera File System) is established by JEITA (Japan Electronics and Information Technology Industries Association). The DCF defines a directory configuration and a file format used when data representing an image captured using a digital still camera is recorded in a removable memory such as a CompactFlash (registered trademark).

In the DCF, the file configuration is defined by an Exif (Exchange Image file Format). Furthermore, the image data is compressed by a JPEG (Joint Photographic Expert Group) method, and thumbnail images, each of which has a pixel matrix of 160×120 pixels without compression, are obtained. Furthermore, camera information may be recorded when the image is captured along with the image data by an Exif tag.

Here, the camera information includes a date, a name of a manufacturer of a camera, a model name, a software version, a shutter speed, an aperture, an auto-exposure program, and a description about a photograph. In such camera information, information other than the description about a photograph can be automatically obtained when the digital still camera is manufactured or when an image is captured.

In the camera information, detailed unique information relating to an object or a shooting location is generally described as the description about a photograph. Examples of the description about a photograph include a description about what is captured and a description about where the image is captured, such as a description "2007 school year XXX elementary school entrance ceremony" and a description "XXX aquarium dolphin show".

To automatically obtain such detailed unique information on a photograph is considerably effective in terms of operability. In order to automatically obtain such detailed unique information on a photograph, for example, automatic GPS (Global Positioning System) information may be utilized or an image recognition technique may be utilized.

However, although general geographic information such as information on Shinjuku in Tokyo can be obtained in terms of a location and match or mismatch of faces can be recognized by the GPS information or the image recognition technique, detailed unique information required for managing photographs (image data) such as names of sightseeing spots, amusement parks, museums, and theme parks cannot be obtained. Therefore, in the related art, detailed unique information on data representing a captured image, that is, description data cannot be managed by automatically associating the description data with the image data.

To address this problem, Japanese Patent Laid-Open No. 2003-198909 discloses a technique of storing in advance a file which stores description data describing an object along with an index in a memory card and inputting the index before an image is captured or after an image is captured. Specifically, obtained image data is stored in the memory card in a file format, and a file regarding the description data is associated with a file regarding the image data using the index to be input.

Furthermore, Japanese Patent Laid-Open No. 2003-242440 discloses a technique of extracting text regions from recognized objects which are included in a plurality of images having different brightness levels included in a moving image, and recognizing characters included in the text regions by means of matching processing performed on the text regions using dictionary images. Specifically, among results of pattern recognition performed on the plurality of images having different brightness levels, a result which represents a high matching rate in the matching processing is output as a final result of the pattern recognition. When this technique is used, text which is difficult to be recognized in an environment which is too dark due to a shadow of an object near the image in the daylight can be appropriately subjected to the pattern recognition using the plurality of images having different brightness levels. Furthermore, text which is difficult to be recognized in an environment which is too bright due to illuminance near the image at night can be appropriately subjected to the pattern recognition using the plurality of images having different brightness levels. Accordingly, accuracy of the pattern recognition is improved.

However, in the technique disclosed in Japanese Patent Laid-Open No. 2003-198909, although the description data which describes the object should be stored in the memory card in advance, the description data cannot be input unless information on a shooting location, for example, is determined. Therefore, when the information cannot be specified, the information is required to be input from the camera or a PC, for example. In this processing, an operation of inputting characters is considerably troublesome when a device which has a limited inputting method such as a camera is used.

Moreover, the technique disclosed in Japanese Patent Laid-Open No. 2003-242440 is used for optimizing text recognition in accordance with change of brightness depending on an environment of shooting of a moving image and is not used for managing information on a shooting location, for example, by automatically associating the information with image data.

SUMMARY OF THE INVENTION

The present invention is provided to address at least one of the foregoing problems.

According to an embodiment of the present invention, there is provided an image pickup apparatus including an image pickup unit configured to capture an image of an object, a pattern recognition unit configured to perform pattern recognition on an image obtained through a pre-photographing operation performed using the image pickup unit, a first storage unit configured to store a result of the pattern recognition performed using the pattern recognition unit, a pattern comparator configured to compare a preceding recognition result stored in the first storage unit with the latest recognition result obtained through the pattern recognition performed using the pattern recognition unit, an updating unit configured to update the preceding recognition result stored in the first storage unit in accordance with a result of the comparison performed using the pattern comparator, and an association unit configured to associate the image captured using the image pickup unit with the recognition result stored in the first storage unit.

Further features of the present invention will become apparent from the following description of exemplary embodiments (with reference to the attached drawings).

BRIEF DESCRIPTION OF THE DRAWINGS

FIGS. 14A to 14D are diagrams illustrating an example of dictionary data included in the digital still camera according to the first exemplary embodiment or the second exemplary embodiment.

DESCRIPTION OF THE EXEMPLARY EMBODIMENTS

Exemplary embodiments of the present invention will be described hereinafter with reference to the accompanying drawings.

Figure 1:
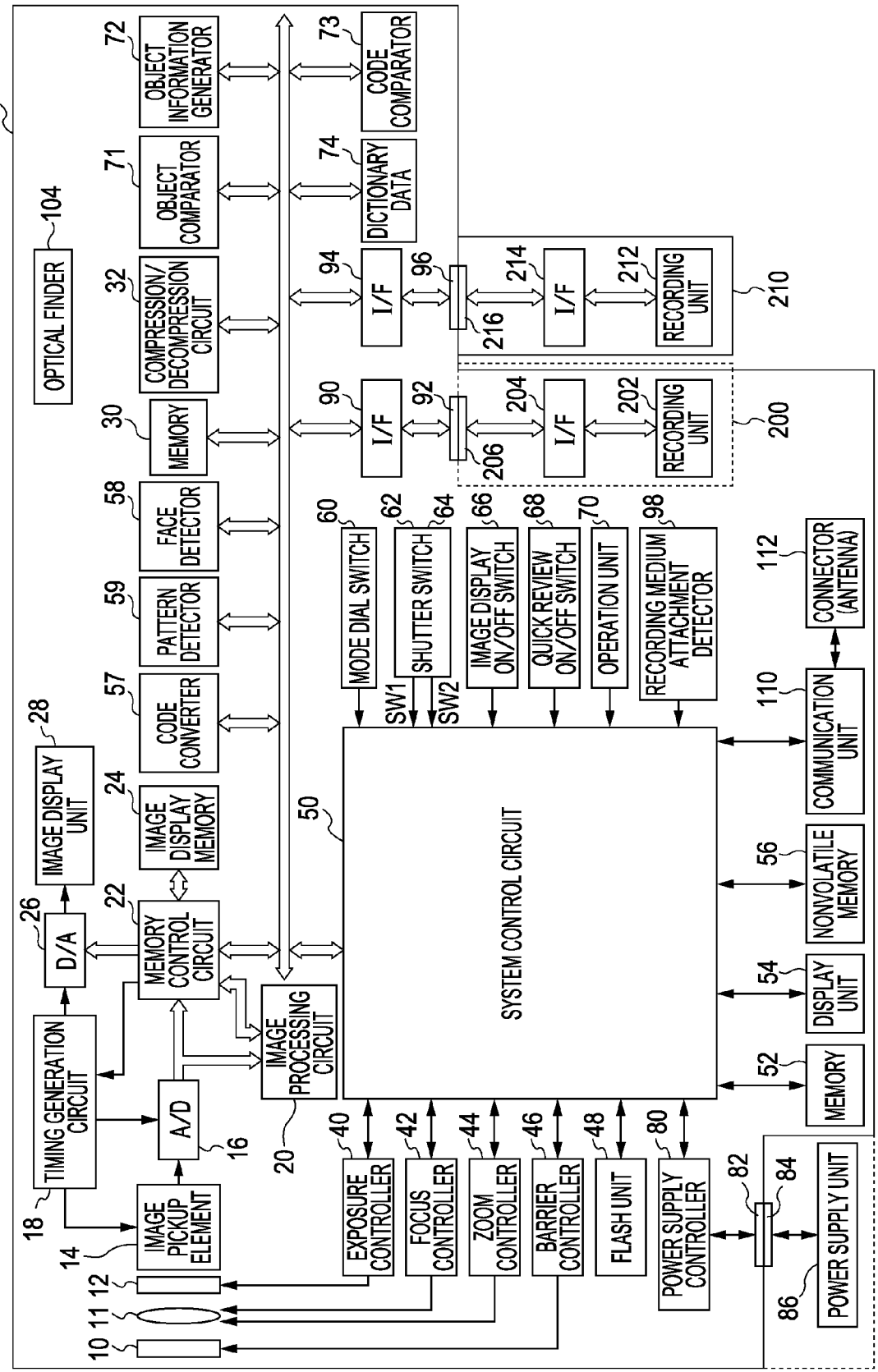
FIG. 1 is a block diagram illustrating an example of a configuration of a digital still camera according to a first exemplary embodiment of the present invention.

FIG. 1 is a block diagram illustrating an example of a configuration of a digital still camera (image pickup apparatus) according to a first exemplary embodiment of the present invention.

Referring to FIG. 1, a digital still camera 100 has the following configuration. The digital still camera 100 includes a photographing lens 11, a shutter 12 having an aperture function, an image pickup element 14 which converts an optical image into an electric signal, and an A/D converter 16 which converts an analog signal output from the image pickup element 14 into a digital signal. A protection unit 10 serves as a barrier which prevents an image pickup unit including the photographing lens 11 from being contaminated or damaged by covering the image pickup unit.

A timing circuit 18 supplies clock signals and control signals to the image pickup element 14, the A/D converter 16, and a D/A converter 26. The timing circuit 18 is controlled by a memory control circuit 22 and a system control circuit 50.

An image processing circuit 20 performs predetermined image correction processing and predetermined color conversion processing on data output from the A/D converter 16 or the memory control circuit 22. Furthermore, the image processing circuit 20 performs predetermined calculation processing using obtained image data whereby part of AF (Auto Focus) processing, AE (Auto Exposure) processing, and EF (Electronic Flash) (preflash) processing employing a TTL (Through The Lens) method is performed. Then, in accordance with a result of the predetermined calculation processing performed using the image processing circuit 20, the system control circuit 50 controls an exposure controller 40 and a focus controller 42 so that the AF processing, the AE processing, and the EF processing employing the TTL method are performed. The image processing circuit 20 further performs predetermined calculation processing using obtained image data and performs AWB (Auto White Balance) processing employing the TTL method in accordance with a result of the calculation processing.

A face detector 58 performs predetermined face detection processing on data output from the image processing circuit 20 or data output from the memory control circuit 22 so as to detect a face portion in an image. As such a face detection technique, various methods have been realized.

For example, as a method for extracting a region of a human face from a captured image, Japanese Patent Laid-Open No. 52-156624 discloses a method for extracting skin-color data from an original image and determining a cluster of a photometric point detected as a skin-color range as a face.

Furthermore, as a method for determining a face region, in Japanese Patent Laid-Open No. 4-346333, a method for converting photometric data into hue and saturation so that a two-dimensional histogram is generated and analyzing the two-dimensional histogram has been proposed.

Moreover, in Japanese Patent Laid-Open No. 8-036597, a method for extracting a face candidate region corresponding to a shape of a human face and determining a face region using a feature information in the face candidate region has been proposed. Note that, in this exemplary embodiment, any method may be employed as the face detection method.

A pattern detector 59 detects a character such as an alphabet letter, a number, a Chinese number, a hiragana letter, a katakana letter, and a Chinese character, a registered company logo, a sign, a face region, a pictograph, and a phrase included in an image using a dictionary data 74 stored in advance. Many methods have been realized as such a pattern recognition technique. In this exemplary embodiment, any method may be employed as the character detection method, and the method is not described herein.

A code converter 57 converts a pattern detected using the pattern detector 59 into code data (hereinafter referred to as "code information"). That is, the code converter 57 performs OCR (Optical Character Reader) processing.

An object information generator 72 generates object information using an image obtained in a live-view mode. An object comparator 71 compares information generated using the object information generator 72 with a predetermined object. Note that the object information generator 72 and the object comparator 71 will be described in detail hereinafter.

A code comparator 73 compares preceding code information with new code information which has been subjected to the conversion operation using the code converter 57 with reference to the dictionary data 74. Note that although described in detail hereinafter, in the live-view mode, the pattern detector 59 appropriately performs pattern detection so that code information is updated in accordance with images successively obtained.

The memory control circuit 22 controls the A/D converter 16, the timing circuit 18, the image processing circuit 20, an image display memory 24, the D/A converter 26, a memory 30, and a compression/decompression circuit 32. Note that data output from the A/D converter 16 is written to the image display memory 24 or the memory 30 through the image processing circuit 20 and the memory control circuit 22 or through only the memory control circuit 22.

An image display unit 28 includes TFTs (Thin-Film Transistors) and an LCD (Liquid Crystal Display). Image data written to the image display memory 24 is supplied through the D/A converter 26 to the image display unit 28 to be displayed. A live-view function (or an electronic finder function) is realized by successively displaying image data successively obtained using the image pickup element 14 in the image display unit 28. A user sets an angle of field, for example, while viewing an image displayed by means of the live-view function and presses a shutter button so that a shooting operation is executed. In the image display unit 28, display is arbitrarily turned on or off in accordance with an instruction supplied from the system control circuit 50. When the display is turned off, power consumption of the digital still camera 100 is considerably reduced.

The memory 30 stores a captured still image and a captured moving image, and has a memory capacity capable of storing the predetermined number of still images and storing a moving image captured for a predetermined period of time. Therefore, even when continuous shooting in which a plurality of still images are continuously captured or even when a panoramic image is captured, the digital still camera 100 can write a considerable number of images to the memory 30 at high speed. The memory 30 may be used as a workspace for the system control circuit 50.

The compression/decompression circuit 32 compresses or decompresses image data by means of adaptive discrete cosine transform (ADCT). The compression/decompression circuit 32 reads an image stored in the memory 30 and performs compression processing or decompression processing on the image, and writes resultant image data to the memory 30.

The exposure controller 40 controls the shutter 12 having the aperture function and realizes a flash modulation function by being collaboratively operated with a flash unit 48. The focus controller 42 controls focusing of the photographing lens 11. A zoom controller 44 controls zooming of the photographing lens 11. A barrier controller 46 controls operation of the protection unit 10 serving as a barrier. The flash unit 48 has a floodlight function for an AF auxiliary light and a flash modulation function.

As described above, the exposure controller 40 and the focus controller 42 are controlled by the TTL method. In accordance with a result of calculation performed using the image processing circuit 20 on data representing a captured image, the system control circuit 50 controls the exposure controller 40 and the focus controller 42.

The system control circuit 50 controls the entire digital still camera 100. A memory 52 stores constants, variables, and programs for operation of the system control circuit 50.

A display unit 54 displays an operation state and a message by means of text, an image, or sound in accordance with an execution of a program by the system control circuit 50. The display unit 54 is installed in a portion or a plurality of portions near an operation unit 70 of the digital still camera 100 so that the user can easily recognize the operation state and the message. The display unit 54 is constituted by a combination of a liquid crystal display device including an LCD and an LED (Light-Emitting Diode), a speaker, and a sound device. Part of functions of the display unit 54 is included in an optical finder 104.

The display unit 54 displays in the LCD, for example, an image representing single-shot operation/continuous shooting operation, an image representing a self-timer function, a compression rate, the number of recorded pixels, the number of recorded images, the number of remaining allowable shots, and an image representing a shutter speed. The display unit 54 further displays an aperture value, an image a representing an exposure correction function, an image representing a state of a flash, an image representing a red-eye-effect-reduction function, an image representing a macro photography function, an image representing a buzzer setting function, an image representing an amount of remaining battery for a clock, an image representing an amount of remaining battery, and an image representing an error. Furthermore, the display unit 54 displays a number having a plurality of digits which represents information, an image representing an attachment state of a recording medium 200 or 210, an image representing operation of a communication I/F, and date and time.

Among images displayed in the display unit 54, an image representing a focal point, an image alarming a blur, an image representing necessity of charging for the flash unit, the image representing a shutter speed, the aperture value, and the image representing exposure correction are displayed in the optical finder 104.

An electrically erasable and recordable nonvolatile memory 56 includes an EEPROM (Electronically Erasable and Programmable Read Only Memory).

A mode dial switch 60, a shutter switch SW1 62, a shutter switch SW2 64, an image display on/off switch 66, a quick review on/off switch 68, and the operation unit 70 are operation blocks used to input various instructions of the system control circuit 50. The operation blocks include a pointing device utilizing a switch, a dial, a touch panel, and visual-line sensing and a sound recognition device and a combination thereof. The operation blocks will be described in detail hereinafter.

The mode dial switch 60 switches function modes from one to another. The function modes include a power off mode, an automatic photographing mode, a photographing mode, a panoramic photographing mode, a reproducing mode, a multi-screen reproducing/deleting mode, and a PC connection mode.

The shutter switch SW1 62 is turned on while a shutter switch (not shown) is operated so as to instruct start of operation of the AF processing, the AE processing, the AWB processing, or the EF processing. The shutter switch SW2 64 is turned on after the operation of the shutter switch (not shown) is completed so as to instruct start of a series of shooting processes. Specifically, the shutter switch SW2 64 instructs start of exposure processing of converting a signal output from the image pickup element 14 into image data through the A/D converter 16 and supplying the image data through the memory control circuit 22 to the memory 30. Then, the shutter switch SW2 64 instructs developing processing performed through calculations using the image processing circuit 20 and the memory control circuit 22. Thereafter, the shutter switch SW2 64 instructs recording processing of reading the image data from the memory 30, compressing the image data using the compression/decompression circuit 32, and writing the image data to a recording medium 200 or a recording medium 210.

The image display on/off switch 66 has a function of turning on or off the image display unit 28. With this function, since a current to be supplied to the image display unit 28 including the TFTs and the LCD is blocked when a photographing operation is performed using the optical finder 104, reduction of power consumption is attained.

The quick review on/off switch 68 is used to set a quick review function of automatically reproducing data representing a captured image immediately after the image is captured. Note that, in particular, the quick review on/off switch 68 sets the quick review function when the image display unit 28 is turned off in this exemplary embodiment.

The operation unit 70 includes various buttons and a touch panel. The various buttons include a menu button, a setting button, a macro-photographing button, a multi-screen reproducing page-break button, a flash setting button, and a single shooting/continuous shooting/self-timer switching button. Furthermore, the various buttons include a menu-change-plus button, a menu-change-minus button, a reproducing-image-change-plus button, a reproducing-image-change-minus button, a photographing image quality selection button, an exposure correction button, and a date-and-time setting button.

A power supply controller 80 includes a battery detection circuit, a DC-DC converter, and a switch circuit used to switch blocks to which current is to be supplied from one to another. The power supply controller 80 detects whether a battery is attached, a type of the battery, and an amount of remaining battery. Furthermore, the power supply controller 80 controls the DC-DC converter in accordance with results of the detections and an instruction supplied from the system control circuit 50, and supplies a required voltage for a required period of time to the various units including the recording media.

Reference numerals 82 and 84 denote connectors. A power supply unit 86 includes a primary battery such as an alkaline battery or a lithium battery, a secondary battery such as an NiCd battery, an NiMH battery, or an Li battery, and an AC adapter.

Interfaces 90 and 94 are used for a recording medium such as a memory card or a hard disk. Connecters 92 and 96 are used to connection with the memory card or the hard disk. A recording medium attachment detector 98 detects whether the recording medium 200 or the recording medium 210 is connected to the connector 92 or the connecter 96.

Note that although the two interfaces and the two connectors are used for attachment of the recording media in this exemplary embodiment, a single interface and a single connecter may be arranged or a plurality of interfaces and a plurality of connecters may be arranged for connection of a recording medium or recording media. Furthermore, a combination of an interface and a connecter which comply with different standards may be arranged.

The interface and the connecter may comply with a standard of a PCMCIA (Personal Computer Memory Card International Association) card or a CF (Compact Flash) card, for example. When the interfaces 90 and 94 and the connecters 92 and 96 are configured so as to comply with the standard of the PCMCIA and or the CF card, various communication cards such as a LAN card and a modem card can be connected through the interfaces 90 and 94 and the connecters 92 and 96. When the connection is established, image data and management information associated with the image data can be transmitted between the digital still camera 100 and a computer or a peripheral such as a printer. Note that, instead of the LAN card or the modem card, a USB card, an IEEE 1394 card, a P1284 card, a SCSI card, or a communication card of a PHS (Personal Handyphone System) may be connected.

The optical finder 104 enables a photographing operation without using the electronic finder function of the image display unit 28. The optical finder 104 includes part of the functions of the display unit 54, such as the display of the focal point, the display of the image alarming a blur, the display of the image representing necessity of charging for the flash unit, the display of the image representing a shutter speed, the display of the aperture value, and the display of the image representing exposure correction.

A communication unit 110 has various communication functions including an RS232C, a USB, an IEEE1394, a P1284, a SCSI, a modem, a LAN, and a wireless communication. A connector (or an antenna) 112 is used to connect the digital still camera 100 to another apparatus through a communication unit 110 in a wired manner or a wireless manner.

The recording medium 200 is a memory card or a hard disk, for example. The recording medium 200 includes a recording unit 202 such as a semiconductor memory or a magnetic disk, an interface 204 used to connect the recording medium 200 to the digital still camera 100, and a connector 206 used to connect the recording medium 200 to the digital still camera 100. Similarly, the recording medium 210 includes a recording unit 212 such as a semiconductor memory or a magnetic disk, an interface 214 used to connect the recording medium 210 to the digital still camera 100, and a connector 216 used to connect the recording medium 210 to the digital still camera 100.

Figure 2:
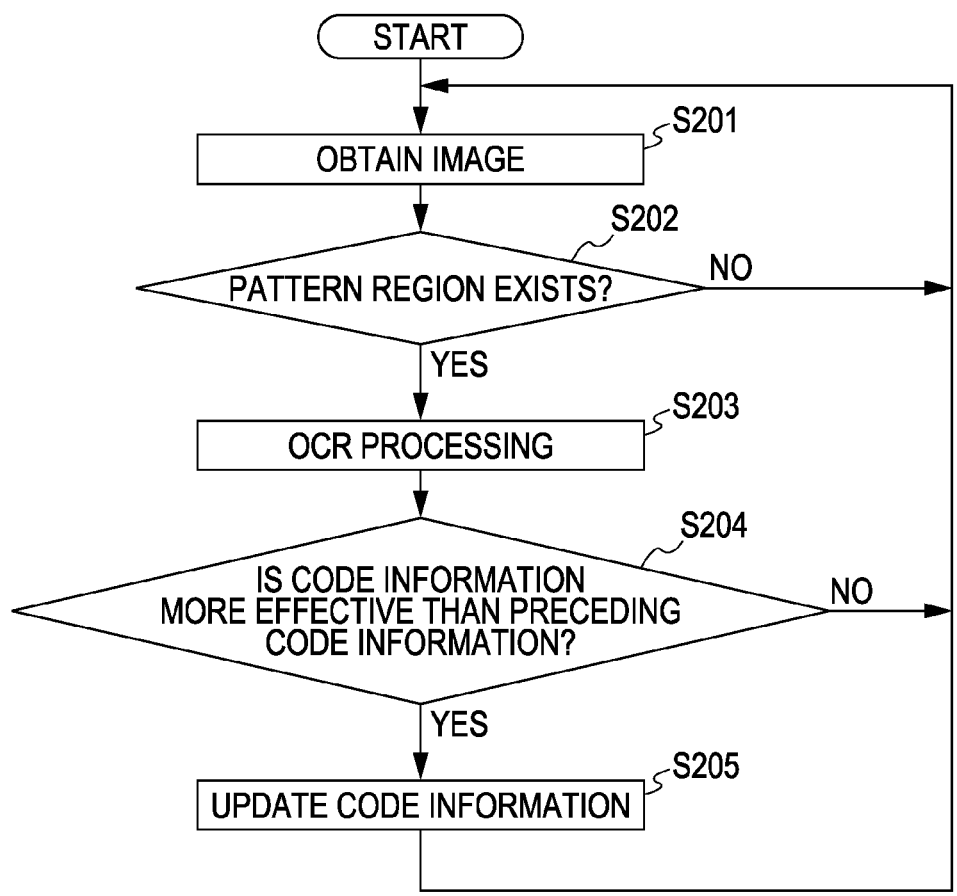
FIG. 2 is a flowchart illustrating an operation of the digital still camera according to the first exemplary embodiment.
Figure 3:
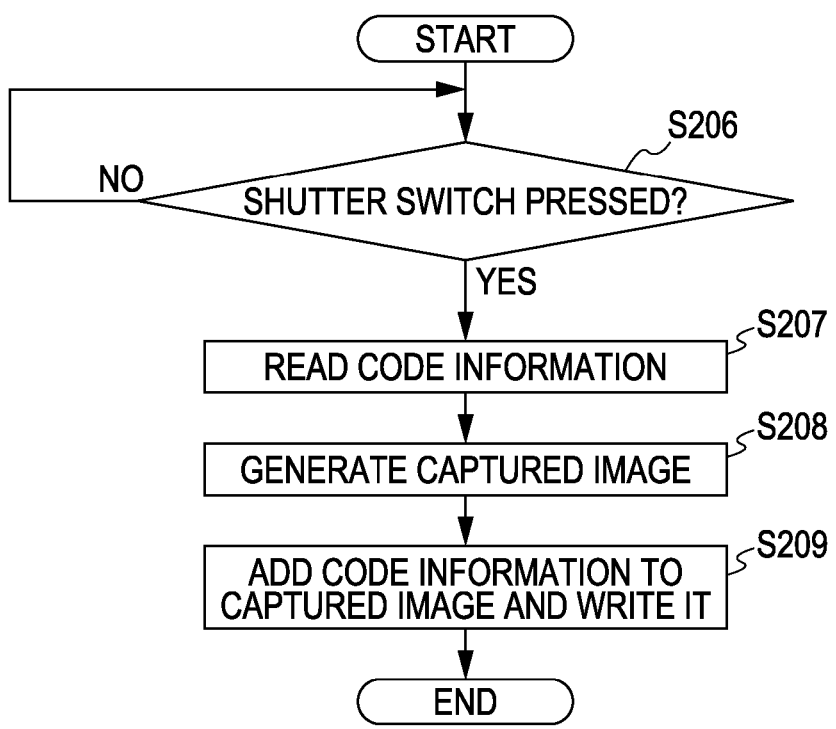
FIG. 3 is a flowchart illustrating another operation of the digital still camera according to the first exemplary embodiment.

Next, a main operation of the digital still camera 100 having the configuration described above will be described with reference to FIGS. 2 and 3. FIG. 2 is a flowchart illustrating an operation of the digital still camera 100 executed in the live-view mode. FIG. 3 is a flowchart illustrating an operation of the digital still camera 100 executed when photographing/recording processing is instructed.

Referring to FIG. 2, in step S201, the digital still camera 100 starts live-view photographing and performs an image obtaining operation. Specifically, an optical image input through the photographing lens 11 is supplied to the image pickup element 14 every predetermined time interval and converted into an electric signal. The electric signal which is an analog signal is supplied to the A/D converter 16 so as to be converted into a digital signal which is image data to be supplied to the image processing circuit 20. The image data is subjected to predetermined calculation processing in the image processing circuit 20. In this way, a pre-photographing image is obtained.

In step S202, the digital still camera 100 determines whether a pattern region is included in the obtained image using the pattern detector 59. When the determination is negative in step S202, the process returns to step S201 where the image obtaining operation is performed whereas when the determination is affirmative in step S202, the process proceeds to step S203.

In step S203, the digital still camera 100 performs the OCR processing using the code converter 57 on the pattern region so as to generate code information. Note that the operations performed in step S201 to step S203 correspond to an example of processing performed using a pattern recognition unit according to the exemplary embodiment of the present invention.

In step S204, the digital still camera 100 compares a result of the OCR processing (the code information, i.e., a recognition result according to the exemplary embodiment of the present invention) with preceding code information stored in advance using the code comparator 73 so as to perform effectiveness determination. When it is determined that effectiveness of the code information is low in step S204, the preceding code information is not updated whereas when it is determined that effectiveness of the code information is high in step S204, the process proceeds to step S205 where the preceding code information is replaced by the latest code information, and thereafter, the process returns to step S201 where the image obtaining operation is performed again. Note that the operation performed in step S204 corresponds to an example of processing performed using a pattern comparator according to the exemplary embodiment of the present invention, and the operation performed in step S205 corresponds to an example of processing performed using an updating unit and a first storage unit according to the exemplary embodiment of the present invention.

As described above, in the live-view mode, the digital still camera 100 detects, every predetermined time interval, a pattern region in an obtained image to be displayed in the live-view display mode and stores and updates the pattern region as code information.

Referring now to FIG. 3, the operation of the digital still camera 100 performed when the photographing/recording processing is instructed will be described. Note that the operation of FIG. 3 and the operation of FIG. 2 are performed in parallel.

In step S206, the digital still camera 100 determines whether the shutter switch SW2 64 is pressed. When the determination is affirmative in step S206, the process proceeds to step S207 where code information which has been stored is read. Then, in step S208, a captured image is generated.

In step S209, the digital still camera 100 adds (associates) the code information obtained in step S207 to the captured image and writes the captured image having the code information to a recording medium such as a CF card or a SD card through an interface 90 or an interface 94. Note that the operation performed in step S209 corresponds to an example of processing performed using an association unit according to the exemplary embodiment of the present invention.

Here, the operations of FIGS. 2 and 3 will be described in detail hereinafter with reference to FIGS. 6 to 13. First, a problem in the related art will be described with reference to FIGS. 6 to 13.

Figure 6A:
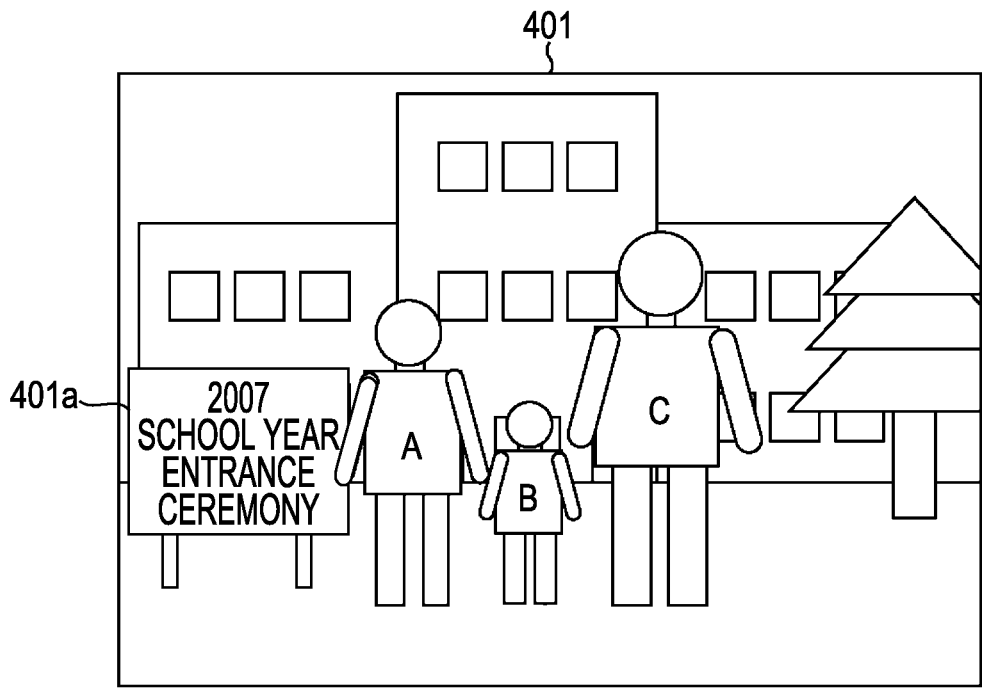
FIGS. 6A and 6B are diagrams illustrating an image captured using the digital still camera according to the first exemplary embodiment or the second exemplary embodiment.
Figure 7A:
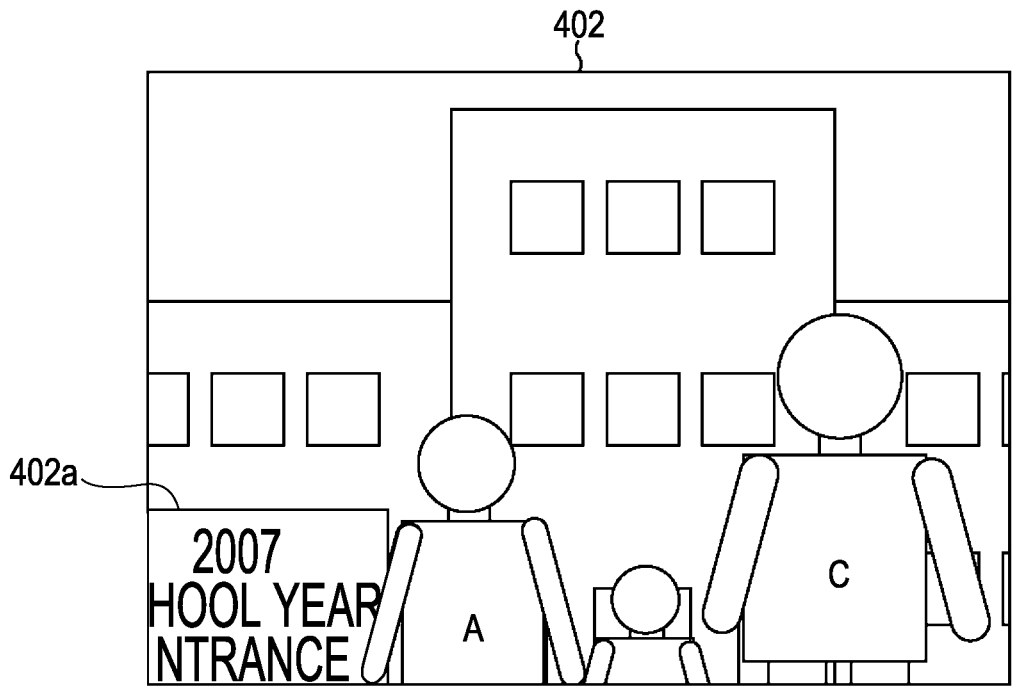
FIGS. 7A and 7B are diagrams illustrating another image captured using the digital still camera according to the first exemplary embodiment or the second exemplary embodiment.
Figure 7B:
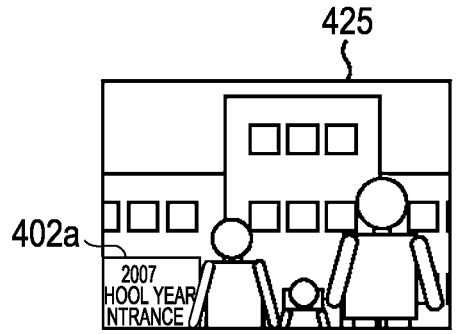

FIG. 6A is a diagram illustrating an image 401 including a sign board region 401a in which "2007 school year entrance ceremony" is shown. When the captured image 401 of FIG. 6A is viewed, it is easy to recognize that the image 401 is captured when the "2007 school year entrance ceremony" is held. On the other hand, when a captured image 402 of FIG. 7A is viewed, it may be barely able to recognize that the image 402 is captured when the "2007 school year entrance ceremony" is held, since enough information for determining such a fact is not obtained. Furthermore, when a captured image 403 of FIG. 8A is viewed, it is not recognized that the image 403 is captured when the "2007 school year entrance ceremony" is held.

Figure 8A:
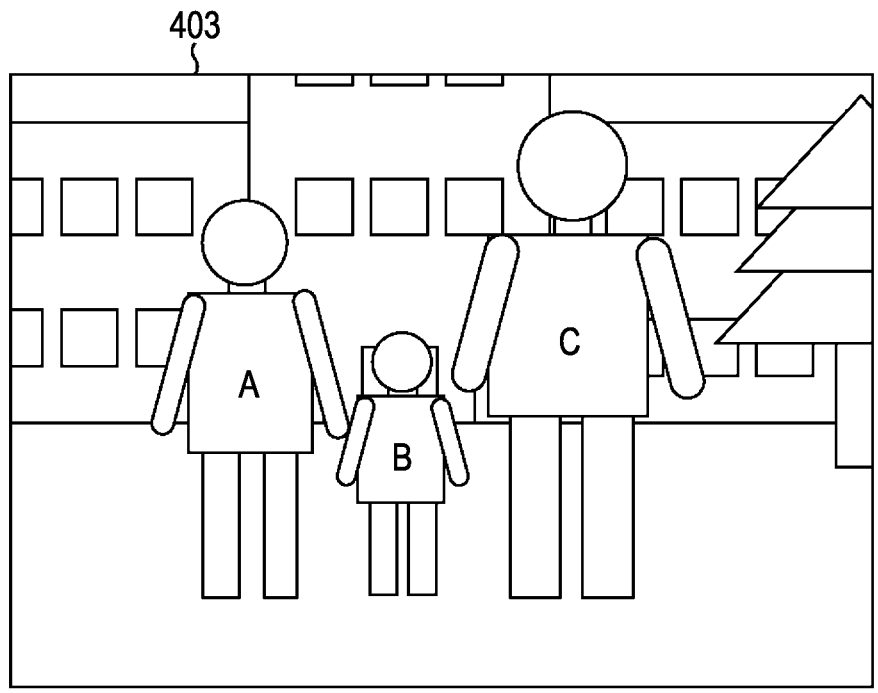
FIGS. 8A and 8B are diagrams illustrating yet another image captured using the digital still camera according to the first exemplary embodiment or the second exemplary embodiment.
Figure 8B:
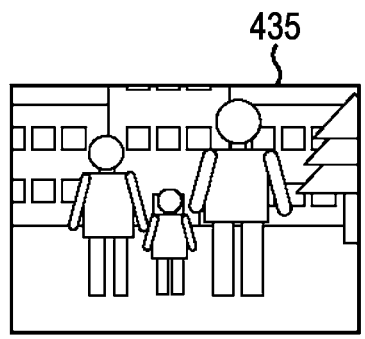
Figures 13A, 13B:
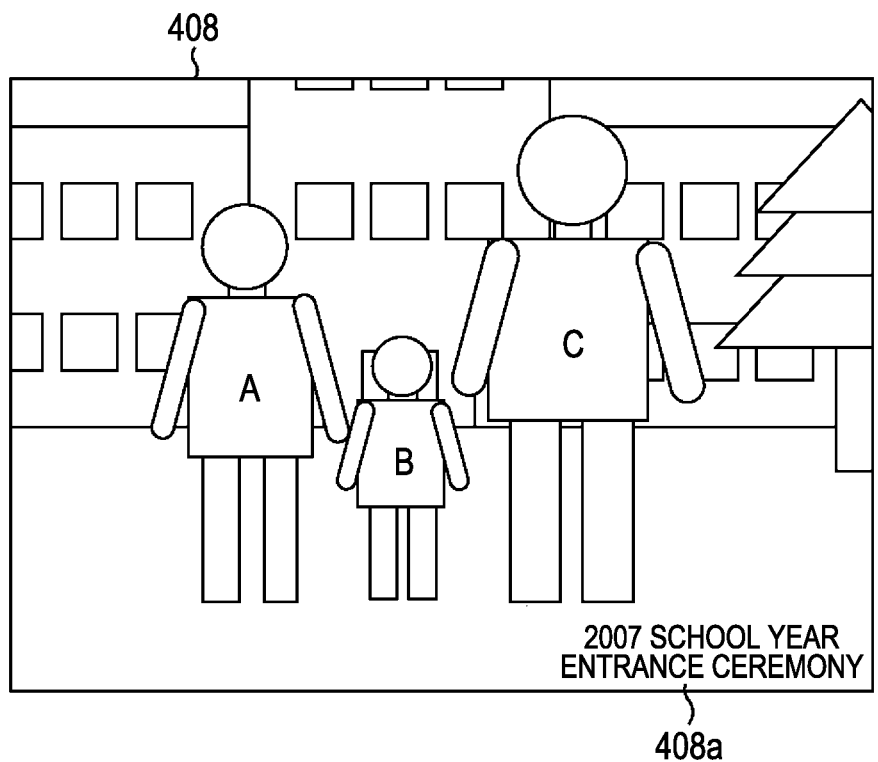
FIGS. 13A and 13B are diagrams illustrating another image captured using the digital still camera according to the first exemplary embodiment or the second exemplary embodiment.

However, even when the image 403 of FIG. 8A is captured, it becomes recognizable that the image 403 is captured when the "2007 school year entrance ceremony" is held by making code information 408a visible at a time of printing as shown in FIG. 13A.

However, in an image pickup apparatus in the related art, a considerably large labor including an operation of adding text information using a personal computer or a camera or an operation of storing text information in advance and associating the text information with an image is required in order to search for a character string or obtain a printed image or a displayed image like the image 408. The digital still camera 100 has been made to reduce such a considerably large labor. Operation of the digital still camera 100 will be described in detail with reference to FIGS. 6 to 8.

Referring to FIG. 6A, in a case where the image 401 is to be captured, after the image obtaining operation is performed in the live-view display mode (step S201 of FIG. 2), the pattern detector 59 determines that a pattern region is detected in the image 401 (step S202 of FIG. 2). Here, the sign board region 401a is detected as the pattern region.

Then, the code converter 57 performs the OCR processing (step S203 of FIG. 2), and the code comparator 73 compares code information corresponding to a result of the OCR processing with preceding code information (step S204 of FIG. 2). Since the code information which is the result of the OCR processing is new code information, the code information is updated (step S205) and the image obtaining operation (step S201) is performed again.

Next, it is assumed that the user changes an angle of shooting, a focusing position, and an exposure while viewing the display unit 54 so that an optimum shooting point, that is, the image 403 of FIG. 8A, which comes after a photographing point corresponding to the image 402 of FIG. 7A, is detected. In this case, the image 402 of FIG. 7A has been obtained by the image obtaining operation in the live-view display mode (step S201) and the pattern detector 59 has determined that the image 402 includes a pattern region, that is, a region 402a, (step S202). Then, the code converter 57 performs the OCR processing (step S203), and the code comparator 73 compares a result of the OCR processing, that is, code information, with preceding code information (step S204). In this comparison, since an amount of the obtained code information is smaller (lower effectiveness) than that of the preceding code information, the code information is not updated. Therefore, the preceding code information is not updated and preceding information "2007 school year entrance ceremony" remains. Note that comparison of the effectiveness of the code information is determined in accordance with clearness of characters with reference to the dictionary data 74. For example, the comparison may be performed in terms of a size of recognized character information or the number of times an identical character or an identical word is repeatedly recognized so that determination as to whether the effectiveness is high is performed provided that a result of the recognition is reliable.

The image 403 of FIG. 8A has been also subjected to the image obtaining operation (step S201) in the live-view display mode. In a case of the image 403, since the pattern detector 59 determines that the pattern region is not included in the image 403 (step S202), the preceding code information is not updated, and therefore, the preceding information "2007 school year entrance ceremony" remains.

Here, when the shutter switch SW2 64 is pressed (step S206), the information "2007 school year entrance ceremony" stored in step S205 is read (step S207). Then, in accordance with a photographing parameter set in the digital still camera 100, a captured image is generated (step S208). Then, the code information "2007 school year entrance ceremony" is added to the captured image and the captured image having the code information is written to the recording medium such as a CF card or an SD card through the interface 90 or the interface 94 (step S209). As described above, the code information "2007 school year entrance ceremony" which is not included in the captured image is automatically associated with the captured image, and the code information can be used for a searching operation and character composition for image display and printing.

As described above, the digital still camera 100 according to the first exemplary embodiment detects a pattern region in the live-view display mode, stores the pattern region as code information which is detailed unique information relating to a captured image, and manages the code information so that the code information is associated with the captured image. In the digital still camera 100 described above, burdensome operations such as an operation of adding the detailed unique code information associated with the captured image to the captured image as text information using a personal computer or a camera can be reduced, and therefore, operability is improved. In particular, in a device in which an inputting method is partly limited, such as a camera, frequency of a considerably burdensome operation of inputting characters can be reduced, and therefore, operability is highly improved.

Furthermore, even when detailed code information cannot be recognized due to small characters or blurred characters included in a captured image, since preceding code information which has been stored is managed so as to be associated with the captured image, burden of an operation of adding character information is reduced, and in addition, excellent management of captured images which are associated with one another is supported.

A second exemplary embodiment of the present invention will be described hereinafter. In this exemplary embodiment, object information is taken into consideration when a determination as to whether code information is updated is made after a pattern region is detected. Note that a digital still camera according to this exemplary embodiment has a configuration the same as that of the digital still camera 100 according to the first exemplary embodiment, and therefore, reference numerals the same as those used in the first exemplary embodiments are used for components the same as those of the first exemplary embodiment, and descriptions thereof are omitted.

Figure 4:
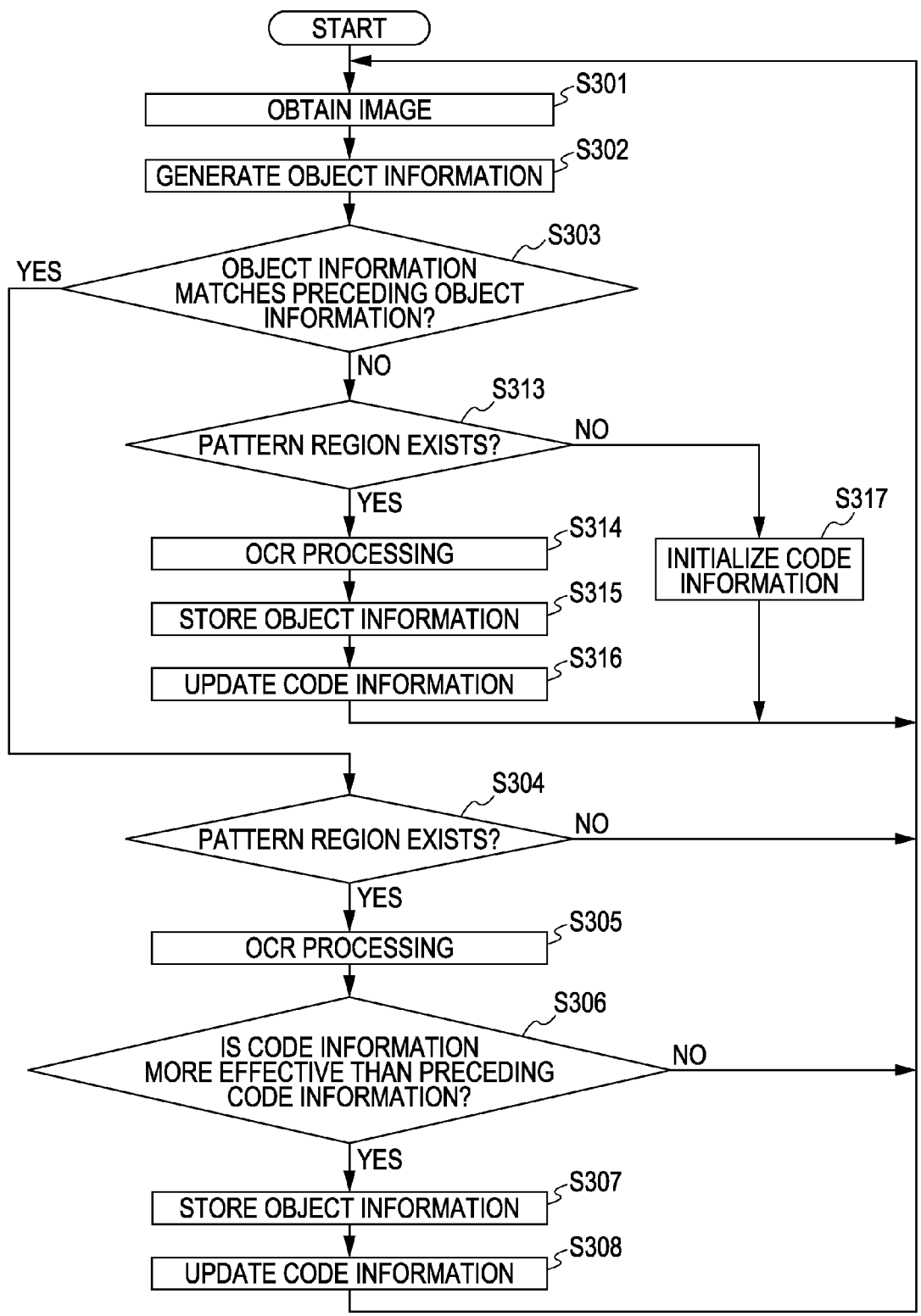
FIG. 4 is a flowchart illustrating an operation of a digital still camera according to a second exemplary embodiment.
Figure 5:
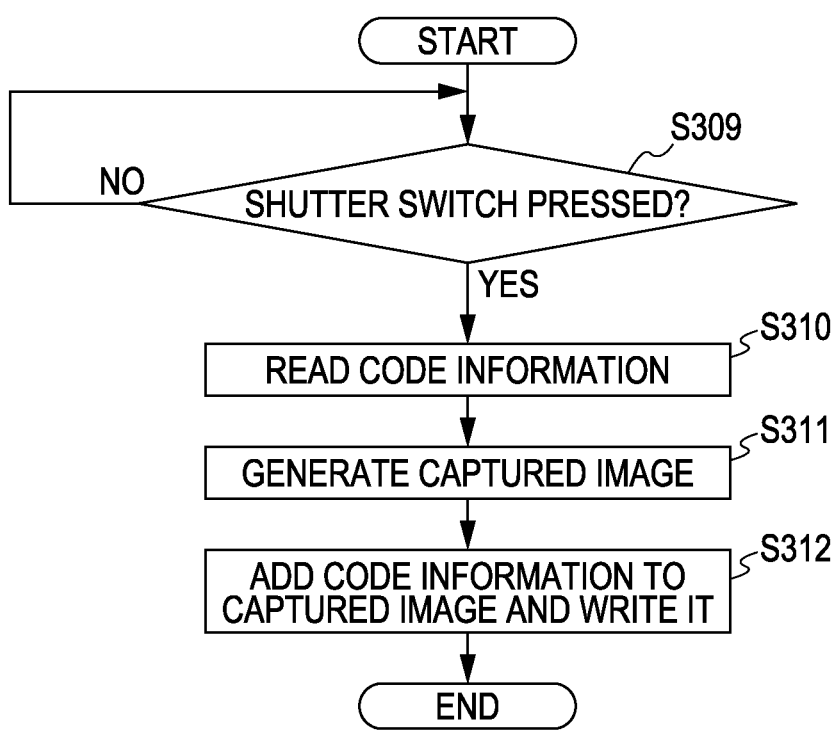
FIG. 5 is a flowchart illustrating another operation of the digital still camera according to the second exemplary embodiment.

A main operation of the digital still camera 100 according to the second exemplary embodiment will be described with reference to FIGS. 4 and 5. FIG. 4 is a flowchart illustrating an operation of the digital still camera 100 which operates in a live-view mode. FIG. 5 is a flowchart illustrating an operation of the digital still camera 100 which operates when photographing/recording processing is instructed.

Referring to FIG. 4, in step S301, the digital still camera 100 enters the live-view mode and performs an image obtaining operation. Specifically, an optical image input through a photographing lens 11 is supplied to an image pickup element 14 and converted into an electric signal. The electric signal which is an analog signal is supplied to an A/D converter 16 so as to be converted into a digital signal which is image data to be supplied to an image processing circuit 20. The image data is subjected to predetermined calculation processing in the image processing circuit 20 whereby the image obtaining operation is performed.

In step S302, the digital still camera 100 generates object information using an object information generator 72. The object information will be described in detail hereinafter. Note that the operation of step S302 corresponds to an example of processing performed using an object information generator according to the exemplary embodiment of the present invention.

In step S303, the digital still camera 100 determines whether the generated object information coincides with preceding object information using an object comparator 71. When the determination is negative in step S303, the process proceeds to step S313 whereas when the determination is affirmative in step S303, the process proceeds to step S304. Note that the operation of step S303 corresponds to an example of processing performed using an object information comparator according to the present invention.

In step S304, the digital still camera 100 determines whether a pattern region is included in the image using a pattern detector 59. When the determination is negative in step S304, the process returns to step S301 where the image obtaining operation is performed again. When the determination is affirmative in step 304, the process proceeds to step S305 where a code converter 57 performs OCR processing. Note that the operations of step S304 and step S305 correspond to an example of processing performed using a pattern recognition unit according to the exemplary embodiment of the present invention.

In step S306, the digital still camera 100 compares a result of the OCR processing with preceding code information using the code comparator 73 so as to perform effectiveness determination. When it is determined that effectiveness of the code information is low in step S306, the preceding code information is not updated and the image obtaining operation is performed again in step S301 whereas when it is determined that the effectiveness of the code information is high in step S306, the process proceeds to step S307 where the object information generated in step S302 is stored and the process further proceeds to step S308 where the code information is replaced by the latest code information, and thereafter, the process returns to step S301 where the image obtaining operation is performed again. Note that the operation performed in step S306 corresponds to an example of processing performed using a pattern comparator according to the exemplary embodiment of the present invention, the operation performed in step S307 corresponds to an example of processing performed using a second storage unit according to the exemplary embodiment of the present invention, and the operation performed in step S308 corresponds to an example of processing performed using the first storage unit according to the exemplary embodiment of the present invention.

On the other hand, when the determination is negative in step S303, the process proceeds to step S313 where the digital still camera 100 determines whether a pattern region is included in the image using the pattern detector 59. When the determination is negative in step S313, the process proceeds to step S317 where code information is initialized and the process returns to step S301 where the image obtaining operation is performed again. On the other hand, when the determination is affirmative in step S313, the process proceeds to step S314. In step S314, the digital still camera 100 performs the OCR processing using the code converter 57 on the pattern region detected in step S313. Then, the object information generated in step S302 is stored in step S315 and code information is updated in step S316, and thereafter, the process returns to step S301 where the image obtaining operation is performed.

Referring to FIG. 5, the operation of the digital still camera 100 performed when the photographing/recording processing is instructed will be described. Note that the operation of FIG. 4 and the operation of FIG. 5 are performed in parallel.

In step S309, the digital still camera 100 determines whether a shutter switch SW2 64 is pressed. When the determination is affirmative in step S309, the process proceeds to step S310 where code information which has been stored is read. Then, in step S311, a captured image is generated.

In step S312, the digital still camera 100 adds the code information obtained in step S310 to the captured image and writes the captured image having the code information to a recording medium such as a CF card or a SD card through an interface 90 or an interface 94.

Here, the operations of FIGS. 4 and 5 will be described in detail hereinafter with reference to FIGS. 6 to 13.

Figure 6B:
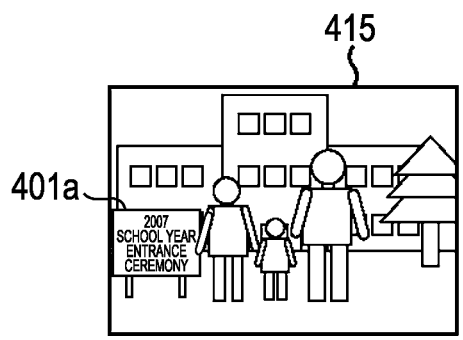

First, an image 401 shown in FIG. 6A is obtained in a live-view display mode (step S301) and object information shown in FIG. 6B is generated using the object information generator 72 (step S302). Then, the object comparator 71 determines whether the generated object information coincides with preceding object information (S303). Here, the determination is negative since the object information is new information, and then, the pattern detector 59 determines whether a pattern region is included in the image (step S313). Since the image 401 includes a pattern region 401a, the code converter 57 performs the OCR processing (step S314). Then, the object information generated in step S302 is stored (step S315) and code information generated through the OCR processing in step S314 is stored (step S316), and thereafter, the image obtaining operation is performed again (step S301).

Note that FIGS. 6B, 7B, 8B, 9B, 10B, 11B, 12B show the object information, and the object information includes a contour image (415, 425, 435, 445, 455, 465, 475), text information, focal length information, lens distance information, and information on the number of people in this exemplary embodiment. Such object information is obtained by extracting a contour of the image, by extracting code information, by specifying information on the number of people by means of a face recognition technique, or by obtaining information on a distance to an object or lens focal length information. Alternatively, the object information may be obtained by specifying the object by means of one of a plurality of general techniques such as zone division in which an image is divided into a plurality of blocks, not shown, and object recognition.

Furthermore, the object information may be determined by monitoring whether an image subjected to pattern recognition is successively enlarged, resized, and moved. However, in this technique of continuous monitoring, problems arise when a shooting operation is interrupted due to auto power off, when the image only includes the sky or the ground, when a lens is exchanged, and when a lens cap is attached. Therefore, improvement of accuracy should be enhanced using the above described techniques and time information in combination. However, a method thereof is not described herein.

Next, it is assumed that the user changes an angle of shooting, a focusing position, and an exposure while viewing the display unit 54 so that an optimum shooting point, that is, the image 403 of FIG. 8A which comes after a photographing point corresponding to the image 402 of FIG. 7A, is detected. In this case, the image 402 of FIG. 7A has been obtained by the image obtaining operation in the live-view display mode (step S301) and object information is generated using the object information generator 72 (step S302). Then, the object comparator 71 determines whether the generated object information coincides with preceding object information (step S303). Here, part of the image 402 coincides with part of the image 401, and therefore, it is determined that the generated object information coincides with preceding object information. Then, the pattern detector 59 determines whether a pattern region is included in the image (step S304).

Since the image 402 includes a pattern region 402a, the code converter 57 performs OCR processing (step S305). Then, a result of the OCR processing, that is, code information, is compared with preceding code information (step S306). In this comparison, since the preceding code information has higher effectiveness, the code information is not updated and the image obtaining operation is performed again (step S301).

The image 403 of FIG. 8A is subjected to the image obtaining operation (step S301) in the live-view display mode and the object information generator 72 generates object information using the image 403 (step S302). Then, the object comparator 71 determines whether the generated object information coincides with preceding object information (step S303). Here, part of the image 403 coincides with part of the image 402, and therefore, it is determined that the generated object information coincides with preceding object information. Then, the pattern detector 59 determines whether the image 403 includes a pattern region (step S304). In a case of the image 403, since the pattern detector 59 determines that the pattern region is not included in the image 403, the code converter 57 does not perform the OCR processing. The preceding code information is not updated, and therefore, the preceding information "2007 school year entrance ceremony" remains and the image obtaining operation is performed again (step S301).

Here, when the shutter switch SW2 64 is pressed (step S309), the information "2007 school year entrance ceremony" stored in step S308 is read (step S310). Then, in accordance with a photographing parameter set in the digital still camera 100, a captured image is generated (step S311). Then, the code information "2007 school year entrance ceremony" is added to the captured image and the captured image having the code information is written to the recording medium such as a CF card or an SD card through the interface 90 or the interface 94 (step S312). As described above, the code information "2007 school year entrance ceremony" is automatically associated with the captured image, and the code information can be used for a searching operation and character composition for image display and printing.

Figure 9A:
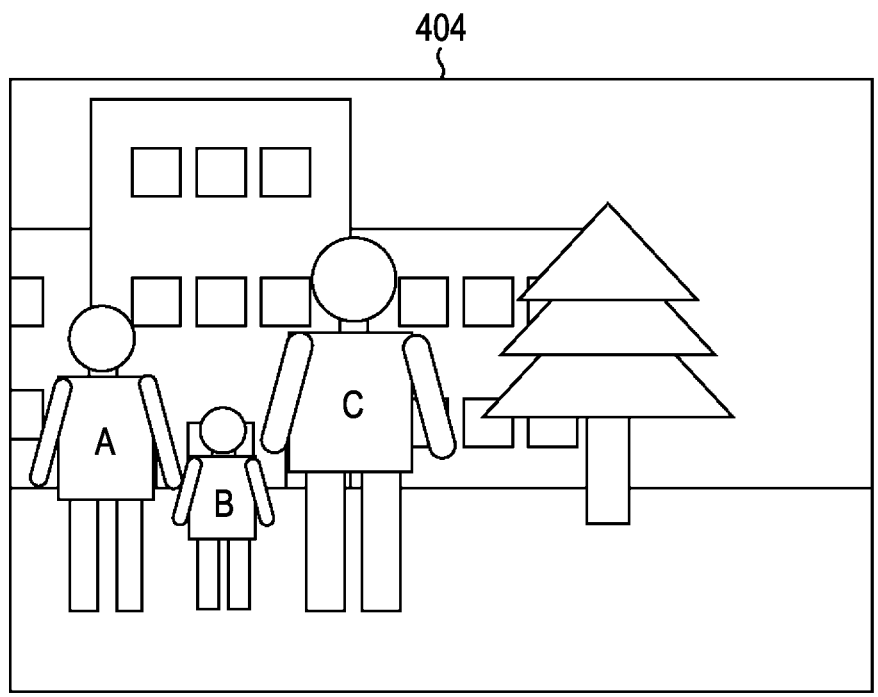
FIGS. 9A and 9B are diagrams illustrating still yet another image captured using the digital still camera according to the first exemplary embodiment or the second exemplary embodiment.

A case where an image 404 shown in FIG. 9A is to be captured will now be described.

Figure 9B:
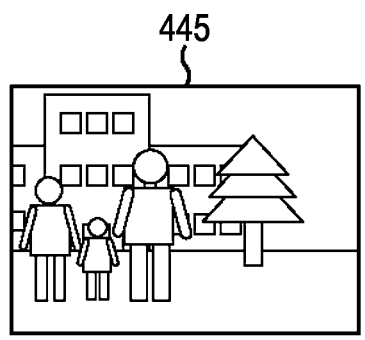

When the image 404 of FIG. 9A is to be captured, the image 404 of FIG. 9A is subjected to the image obtaining operation (step S301) in the live-view display mode and the object information generator 72 generates object information as shown in FIG. 9B (step S302). Then, the object comparator 71 determines whether the generated object information coincides with preceding object information (step S303). Here, part of the image 404 coincides with part of the image 403, and therefore, it is determined that the generated object information coincides with preceding object information. Then, the pattern detector 59 determines whether the image 404 includes a pattern region (step S304). In a case of the image 404, since the pattern detector 59 determines that the pattern region is not included in the image 404, the code converter 57 does not perform the OCR processing and the preceding code information is not updated. Therefore, the preceding information "2007 school year entrance ceremony" remains and the image obtaining operation is performed again (step S301).

Here, when the shutter switch SW2 64 is pressed (step S309), the information "2007 school year entrance ceremony" stored in step S308 is read (step S310). Then, in accordance with a photographing parameter set in the digital still camera 100, a captured image is generated (step S311). Then, the code information "2007 school year entrance ceremony" is added to the captured image and the captured image having the code information is written to the recording medium such as a CF card or an SD card through the interface 90 or the interface 94 (step S312). As described above, the code information "2007 school year entrance ceremony" is automatically associated with the captured image also in the case where the image 404 of FIG. 9A is captured, and the code information can be used for a searching operation and character composition for image display and printing.

Figure 10A:
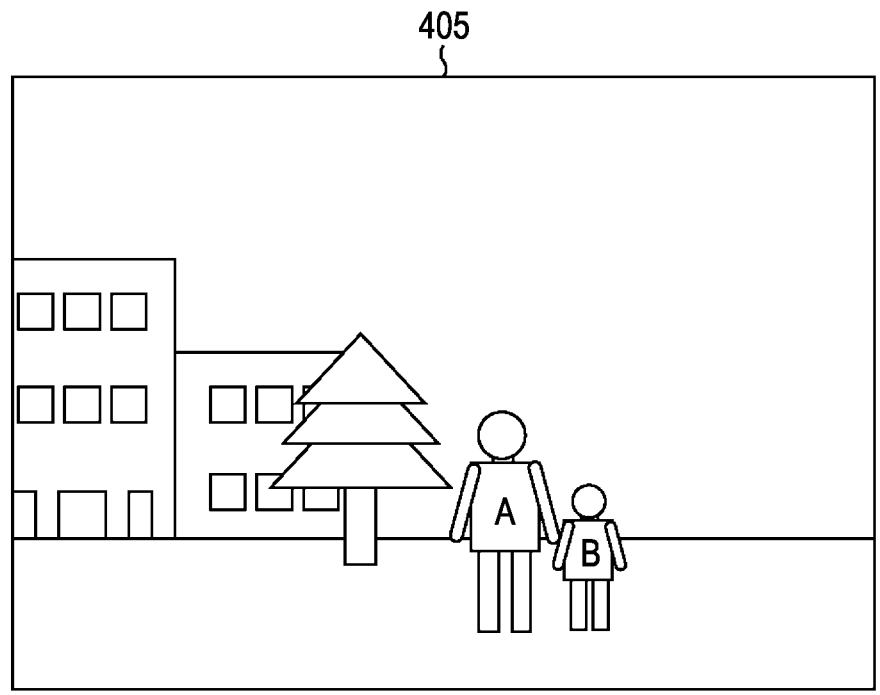
FIGS. 10A and 10B are diagrams illustrating another image captured using the digital still camera according to the first exemplary embodiment or the second exemplary embodiment.

A case where an image 405 shown in FIG. 10A is to be captured will now be described.

Figure 10B:
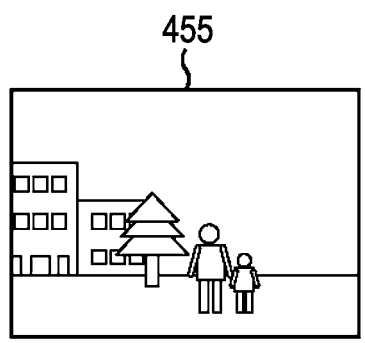

When the image 405 of FIG. 10A is to be captured, the image 405 of FIG. 10A is subjected to the image obtaining operation (step S301) in the live-view display mode and the object information generator 72 generates object information as shown in FIG. 10B (step S302). Then, the object comparator 71 determines whether the generated object information coincides with preceding object information (step S303). Here, part of the image 405 coincides with part of the image 403, and therefore, it is determined that the generated object information coincides with preceding object information. Then, the pattern detector 59 determines whether the image 405 includes a pattern region (step S304). In a case of the image 405, since the pattern detector 59 determines that the pattern region is not included in the image 405, the code converter 57 does not perform the OCR processing and the preceding code information is not updated. Therefore, the preceding information "2007 school year entrance ceremony" remains and the image obtaining operation is performed again (step S301).

Here, when the shutter switch SW2 64 is pressed (step S309), the information "2007 school year entrance ceremony" stored in step S308 is read (step S310). Then, in accordance with a photographing parameter set in the digital still camera 100, a captured image is generated (step S311). Then, the code information "2007 school year entrance ceremony" is added to the captured image and the captured image having the code information is written to the recording medium such as a CF card or an SD card through the interface 90 or the interface 94 (step S312). As described above, the code information "2007 school year entrance ceremony" is automatically associated with the captured image also in the case where the image 405 of FIG. 11A is captured, and the code information can be used for a searching operation and character composition for image display and printing.

Figure 11A:
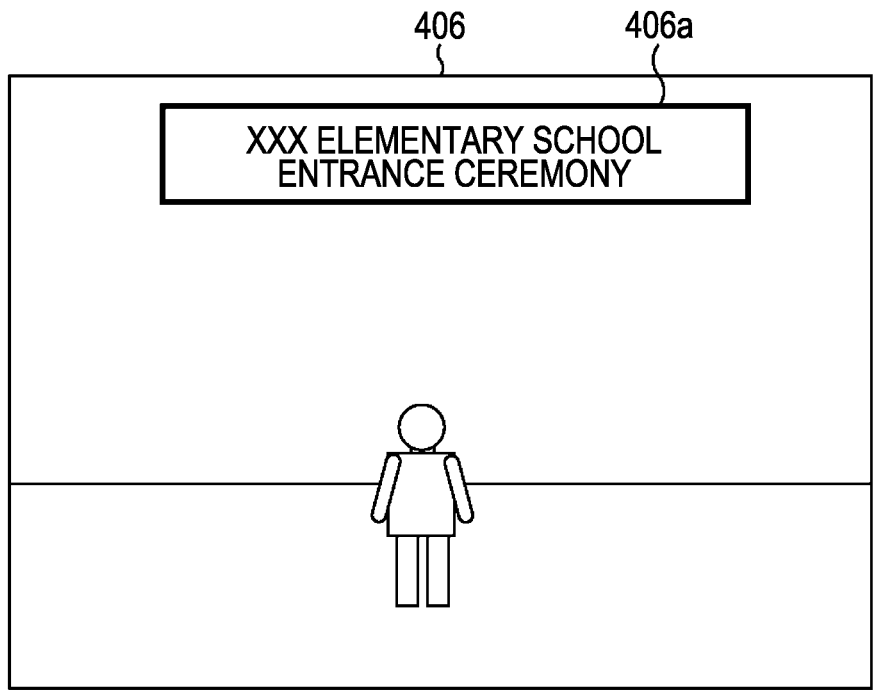
FIGS. 11A and 11B are diagrams illustrating another image captured using the digital still camera according to the first exemplary embodiment or the second exemplary embodiment.

A case where an image 406 shown in FIG. 11A is to be captured will now be described.

Figure 11B:
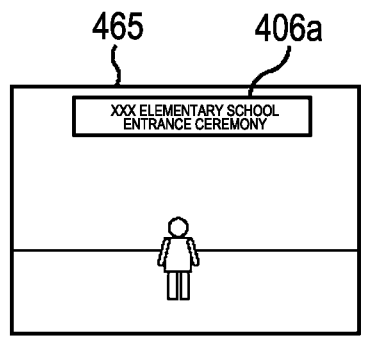

When the image 406 of FIG. 11A is to be captured, the image 406 of FIG. 11A is subjected to the image obtaining operation (step S301) in the live-view display mode and the object information generator 72 generates object information as shown in FIG. 11B (step S302). Then, the object comparator 71 determines whether the generated object information coincides with preceding object information (step S303). Here, even part of the image 406 does not coincide with the image 405, and therefore, it is determined that the generated object information does not coincide with preceding object information. Then, the pattern detector 59 determines whether the image 406 includes a pattern region (step S313). In a case of the image 406, since the pattern detector 59 determines that the pattern region (406a) is included in the image 406, the code converter 57 performs the OCR processing (step S314) and the preceding code information is updated to code information "XXX elementary school entrance ceremony" and the image obtaining operation is performed again (step S301).

Here, when the shutter switch SW2 64 is pressed (step S309), the information "XXX elementary school entrance ceremony" stored in step S316 is read (step S310). Then, in accordance with a photographing parameter set in the digital still camera 100, a captured image is generated (step S311). Then, the code information "XXX elementary school entrance ceremony" is added to the captured image and the captured image having the code information is written to the recording medium such as a CF card or an SD card through the interface 90 or the interface 94 (step S312). As described above, the code information "XXX elementary school entrance ceremony" is automatically associated with the captured image in the case where the image 406 of FIG. 11A is captured, and the code information can be used for a searching operation and character composition for image display and printing.

Figure 12A:
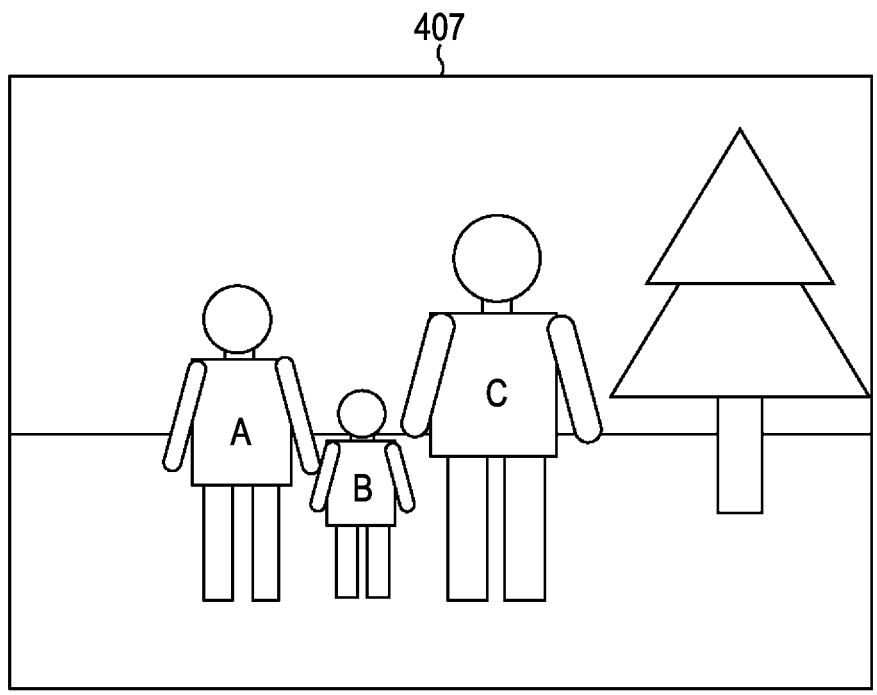
FIGS. 12A and 12B are diagrams illustrating still yet an image captured using the digital still camera according to the first exemplary embodiment or the second exemplary embodiment.

A case where an image 407 shown in FIG. 12A is to be captured will now be described.

Figure 12B:
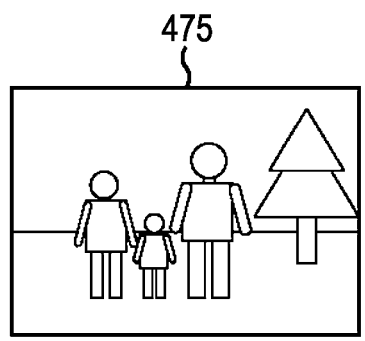

When the image 407 of FIG. 12A is to be captured, the image 407 of FIG. 12A is subjected to the image obtaining operation (step S301) in the live-view display mode and the object information generator 72 generates object information as shown in FIG. 12B (step S302). Then, the object comparator 71 determines whether the generated object information coincides with preceding object information (step S303). Here, even part of the image 407 does not coincide with the image 406, and therefore, it is determined that the generated object information does not coincide with preceding object information. Then, the pattern detector 59 determines whether the image 407 includes a pattern region (step S313). In a case of the image 407, since the pattern detector 59 determines that the pattern region is not included in the image 407, the code converter 57 does not perform the OCR processing and the code information is initialized (step S317) and the image obtaining operation is performed again (step S301).

Here, when the shutter switch SW2 64 is pressed (step S309), the code information stored in step S308 and the code information stored in step S316 are read (step S310). Then, in accordance with a photographing parameter set in the digital still camera 100, a captured image is generated (step S311). Then, the code information is added to the captured image and the captured image having the code information is written to the recording medium such as a CF card or an SD card through the interface 90 or the interface 94 (step S312). Therefore, as described above, information representing a face that the code information does not exist is automatically associated with the captured image in the case where the image 407 of FIG. 12A is captured. Accordingly, undesired use of the code information for a searching operation and character composition for image display and printing is prevented.

As described above, in the digital still camera 100 according to the second exemplary embodiment, the pattern region is detected in the live-view display mode and is stored as detailed unique code information. In addition, object information is specified in advance, and the code information is updated in accordance with the object information. Then, the code information and the captured image are managed so as to be associated with each other. In the digital still camera 100 described above, burdensome operations such as an operation of adding the detailed unique code information associated with the captured image to the captured image as text information using a personal computer or a camera can be reduced, and therefore, operability is improved. In particular, in a device in which an inputting method is partly limited, such as a camera, frequency of a considerably burdensome operation of inputting characters can be reduced, and therefore, operability is highly improved. Furthermore, since preceding code information and generated code information are compared with each other and managed in accordance with a result of the comparison, an image is prevented from being associated with wrong code information, and therefore, operability is further improved.

Here, FIGS. 14A to 14D show examples of portions of the dictionary data 74 of FIG. 1 which are data blocks used to convert "Bitmap" images into characters. Use of such dictionary data of FIGS. 14A to 14D enables the pattern detector 59 and the code converter 57 to determine a person's name from a face image, a sign name from a signboard, and a company name from a company logo.

In the foregoing exemplary embodiments, the pattern detector 59 detects a pattern region including text and the pattern region is managed as code information. However, the present invention is not limited to this. For example, a company logo image, a signboard image, or a face image may be detected as a pattern region and managed as code information, and in addition, a company logo image, a signboard image, or a face image may be converted into a corresponding character string to be added to a printed image or a displayed image.

Note that to realize the present invention, a recording medium including program codes (computer programs) of software which realizes functions of the foregoing exemplary embodiments may be used. In this case, the recording medium is installed in a system or an apparatus, and a computer (or a CPU or an MPU) included in the system or the apparatus reads and executes the program codes stored in the recording medium whereby the functions are realized.

In this case, since the program codes read from the recording medium realize the functions of the foregoing exemplary embodiments, the program codes and the recording medium which stores the program codes are included in the present invention.

Examples of the recording medium used to supply the program code include a flexible disk, a hard disk, an optical disc, a magneto-optical disc, a CD-ROM (Compact Disc Read-Only Memory), a CD-R (Compact Disc Readable), a magnetic tape, a nonvolatile memory card, and a ROM.

It is apparent that a case where an OS (Operating System) operating in the computer performs part of or entire processing in response to instructions of the program codes is also included in the present invention.

Furthermore, the program codes read from the recording medium may be written to a memory included in a function expansion board inserted into the computer or a memory included in a function expansion unit connected to the computer. In this case, a CPU, for example, included in the function expansion board or the function expansion unit may perform part of or entire processing in response to instructions of the written program codes.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-295989 filed Nov. 14, 2007, which is hereby incorporated by reference herein in its entirety.

What is claimed is:

1. An image pickup apparatus comprising:
   an image pickup unit configured to capture an image of an object;
   a reception unit configured to receive an image pickup instruction from a user;
   a pattern recognition unit configured to perform pattern recognition on a part of a region where included in the image obtained at a predetermined timing through the image pickup unit before receiving the image pickup instruction;
   a memory configured to store a recognition result obtained through the pattern recognition performed using the pattern recognition unit;
   a controlling unit configured to control whether to update the recognition result stored in the memory with a current comparison result by comparing a recognition result newly obtained through the pattern recognition unit and the recognition result stored in the memory;
   a recording unit configured to record, in a recording medium, the image obtained by the image pickup unit in association with the recognition result stored in the memory, in response to the reception of the image pickup instruction by the reception unit; and
   a determination unit configured to determine whether an object in a newly obtained image obtained by the image pickup unit and an object used for obtaining the recognition result stored in the memory match with each other,
   wherein in a case where the determination unit determines that the objects match with each other, even when there is no region to perform the pattern recognition in the image obtained by the image pickup unit, the recognition result stored in the memory is kept, and
   wherein the recording unit records, in the recording medium, the image obtained by the image pickup unit in association with the recognition result stored in the memory, in response to the reception of the image pickup instruction by the reception unit.

2. The image pickup apparatus according to claim 1, wherein the controlling unit updates the recognition result stored in the memory to a newly obtained recognition result in a case where it is determined that the recognition result obtained through the pattern recognition of newly obtained image is more effective code information than the recognition result stored in the memory,
   wherein, in a case where an amount of a code information as the recognition result obtained through the pattern recognition of newly obtained image is smaller than that stored in the memory as the recognition result, effectiveness of the code is determined as low.

3. A control method of an image pickup apparatus comprising an image pickup unit and a memory, the method comprising:
   capturing an image of an object by the image pickup unit;
   performing pattern recognition on a part of a region where included in the image obtained at a predetermined timing through the image pickup unit before receiving an image pickup instruction from a user;
   recording a recognition result obtained through the pattern recognition in the memory;
   controlling whether to update the recognition result recorded in the memory with a current comparison result by comparing a recognition result newly obtained through the pattern recognition and the recognition result recorded in the memory;
   recording, in a recording medium, the image obtained by receiving the image pickup instruction from a user in association with the recognition result stored in the memory in prior to the reception of the image pickup instruction from a user; and
   determining whether an object in a newly obtained image and an object used for obtaining the recognition result stored in the memory match with each other, wherein in a case where it is determined that the objects match with each other, even when there is no region to perform the pattern recognition in the image obtained, the recognition result stored in the memory is kept, and recording, in the recording medium, the obtained image in association with the recognition result stored in the memory, in response to the reception of the image pickup instruction by a reception unit.

4. An image pickup apparatus comprising:

an image pickup unit configured to capture an image of an object;

a reception unit configured to receive an image pickup instruction from a user;

a pattern recognition unit configured to perform pattern recognition on region included in the image obtained at a predetermined timing through the image pickup unit and generate information indicating a character based on a result of the performed pattern recognition before the image pickup instruction is received by the reception unit;

a memory configured to store the information indicating a character generated by the pattern recognition unit; and a control unit configured to perform control such that, in a case where the region on which the pattern recognition has been performed to generate the information indicating the character is not included in an image obtained after the image pickup instruction is received by the reception unit, the information indicating the character read out from the memory is recorded in a recording medium together with the obtained image.

5. The image pickup apparatus according to claim 4, further comprising:

a comparing unit configured to determine whether at least a part of a region within an image obtained by the image pickup unit before the image pickup instruction is received by the reception unit and an image obtained by the image pickup unit after the image pickup instruction is received by the reception unit matches or not, wherein, in a case where at least a part of the region within an image obtained before receiving the image pickup instruction and an image obtained after receiving the image pickup instruction matches, the control unit performs control such that the information indicating the character read out from the memory is recorded in the recording medium together with the image obtained after receiving the image pickup instruction even if the image in which the determination is performed by the comparing unit doesn't include the region where the pattern recognition is performed by the pattern recognition unit.

6. The image pickup apparatus according to claim 4, further comprising:

an updating unit configured to update the information indicating the character stored in the memory in a case where it is determined by the comparing unit that the information indicating the character newly obtained through the pattern recognition is more effective than the recognized information indicating the character stored in the memory.

7. The image pickup apparatus according to claim 6, wherein the updating unit updates the recognized information indicating the character stored in the memory, in a case where at least a part of the region within an image obtained by the image pickup unit before receiving the image pickup instruction and an image obtained after the image is obtained matches, and also in a case where it is determined that the information indicating the character obtained through the pattern recognition of the image which is obtained after the image is more effective than the recognized information indicating the character stored in the memory.

8. The image pickup apparatus according to claim 4, wherein the image obtained by the image pickup unit before receiving the image pickup instruction is an image obtained for a live-view display.

9. The image pickup apparatus according to claim 4, wherein the control unit performs control such that the information indicating the character, the image and focal length information are recorded in the recording medium.

10. A control method of an image pickup apparatus comprising an image pickup unit configured to obtain an image of an object and a reception unit configured to receive an image pickup instruction from a user, the method comprising:

performing pattern recognition on a region included in the image obtained at a predetermined timing through the image pickup unit and generate information indicating a character based on a result of the performed pattern recognition before an image pickup instruction is received by the reception unit from a user;

storing the information indicating a character generated by the pattern recognition unit in a memory; and perform control such that, in a case where the region on which the pattern recognition has been performed to generate the information indicating the character is not included in an image obtained after the image pickup instruction is received by the reception unit, the information indicating the character read out from the memory is recorded in a recording medium together with the obtained image.

* * * * *